United States Patent [19]
Ofer

[11] Patent Number: 5,996,030
[45] Date of Patent: Nov. 30, 1999

[54] SYSTEM FOR PROVIDING AN INTERROGATING HOST COMPUTER WITH GROUP STATUS INFORMATION ABOUT DISK DEVICES INCLUDING STATUS INFORMATION REGARDING DISK DEVICES NOT ACCESSIBLE TO SAID HOST

[75] Inventor: Erez Ofer, Brookline, Mass.

[73] Assignee: EMC Corporation, Hopkinton, Mass.

[21] Appl. No.: 08/775,575

[22] Filed: Dec. 31, 1996

[51] Int. Cl.⁶ .................................................. G06F 13/14
[52] U.S. Cl. .................................. 710/19; 360/69; 360/75
[58] Field of Search ........................ 364/200; 395/200.8; 710/19; 711/114, 156; 360/69, 75

[56] References Cited

U.S. PATENT DOCUMENTS

| | | | |
|---|---|---|---|
| 4,396,984 | 8/1983 | Videki, II | 710/38 |
| 4,783,730 | 11/1988 | Fischer | 364/200 |
| 4,864,532 | 9/1989 | Reeve | 364/900 |
| 5,438,528 | 8/1995 | Emerson et al. | 364/580 |
| 5,465,251 | 11/1995 | Judd et al. | 370/54 |
| 5,652,839 | 7/1997 | Giorgio et al. | 395/200 |

*Primary Examiner*—Thomas C. Lee
*Assistant Examiner*—Abdelmonieml Elamin
*Attorney, Agent, or Firm*—Fish & Richardson P.C.

[57] ABSTRACT

A method and apparatus for determining information about a plurality of disk storage devices connected to an interrogating host computer through a disk drive controller employ, in one embodiment, an EVPD Inquiry command to obtain from a disk controller, connected to the interrogating host computer over a SCSI bus, the necessary information for devices which are not accessible to the interrogating host. The disk drive controller has sufficient capability to obtain the necessary information from the disk storage devices and format it for presentation to the host computer using standard VPD pages.

23 Claims, 3 Drawing Sheets

| BYTE | REPRESENTATION |
|---|---|
| 0 | OP-CODE — 60 |
| 1 | EVPD BIT — 62 |
| 2 | PAGE CODE — 64 |
| 3 | RANGE — 66 |
| 4 | LENGTH — 68 |
| 5 | CONTROL BYTE — 70 |

FIG. 3

| BYTES | REPRESENTATION |
|---|---|
| 80 — 00-0F | STANDARD VENDOR FORMAT |
| 82 — 10-1F | SPECIFIC HEADER FOR THE REQUESTED PAGE |
| 84 — 20-FF | DEVICE RECORDS |

FIG. 4

| BYTES | REPRESENTATION |
|---|---|
| 86 — 00-01 | NUMBER OF DEVICES RETURNED PER PAGE |
| 87 — 02-03 | LENGTH OF RECORD PER DEVICE |
| 88 — 04-0F | SPECIFIC INFORMATION |

FIG. 5

| PAGE CODE | REPRESENTATION | RECORD LENGTH |
|---|---|---|
| 01 | DEVICE PROTECTION | 2 |
| 02 | DEVICE STATUS | 4 |
| 03 | DEVICE WRITE/FORMAT CNT | 8 |
| 04 | DEVICE INVALID TRACKS | 16 |

FIG. 6

SYSTEM FOR PROVIDING AN INTERROGATING HOST COMPUTER WITH GROUP STATUS INFORMATION ABOUT DISK DEVICES INCLUDING STATUS INFORMATION REGARDING DISK DEVICES NOT ACCESSIBLE TO SAID HOST

BACKGROUND OF THE INVENTION

The invention relates generally to disk storage systems for controlling arrays of disk drives, and in particular, to a method for obtaining information, such as status information, about groups of the disk drives.

In a typical high speed disk array system, such as that manufactured by EMC Corporation under the name Symmetrix®, the disk array system receives, from connected host computers, input/output (I/O) requests through an interconnection channel. In an open-systems environment, a typical channel is a SCSI channel, and the I/O requests are typically composed of read and write operations. Traditionally, these disk storage systems were passive storage systems making large amounts of magnetic disk storage available to The host computers connected to them. As the speed of the interconnections between the host and the disk drive arrays has increased, and as the arrays themselves, which can be controlled by a single disk controller, have both grown in size and become more intelligent, more information is available about the array and more information can be received and processed at the host computers, as well as at the disk drive controller, about the status of the system.

In those systems wherein a plurality of host computers connect to a single disk drive controller (the Symmetrix® controller for example) over a SCSI bus, a host has the ability to send a SCSI Inquiry command to the disk drive controller to obtain information about the devices to which that host has access. However, as graphical user interfaces (GUI's) develop for greater control of the disk drive system, as a whole, from a host computer, it becomes increasingly important for the controlling host computer to have as much information available to it as possible. Nevertheless, protocols, as the SCSI protocol, do not provide a mechanism for obtaining information about disk drives which are not available to the inquiring computer itself.

In particular, some mechanism is needed, in a SCSI environment, which enables a host computer to make inquiries of all or a group of disk drives, not all of which are normally accessible to the host. No mechanism exists in the SCSI command library, which is well defined, to perform that function. The closest; command is a standard Inquiry command, in which the host computer can obtain information about a designated disk drive to which it has access.

SUMMARY OF THE INVENTION

The invention relates to a method and apparatus for determining information about a plurality of disk storage devices connected to an interrogating host computer through a disk drive controller. The host computer is one of a plurality of host computers connected to the disk storage controller, the interrogating host being connected to the storage controller over a network bus interface. The interrogating host has access to less than all of the plurality of storage devices about which it requires information.

The method features the steps of sending a group status inquiry command from the interrogating host computer to the disk storage controller and returning from the disk storage controller the requested group status information, that is, group status information including status information regarding disk storage devices not otherwise accessible to the interrogating host computer.

In specific embodiments, the method further features the step of storing information regarding a group, or groups, of the disk storage devices at the disk storage controller. In a particular embodiment, the network bus interface is a SCSI bus, the group status inquiry command is a SCSI EVPD Inquiry command, and the returned, requested group status information is contained and returned in VPD pages. Yet more specifically, the Inquiry command specifies a list of devices for which status information is requested, an identification of the types of information which are to be returned, and preferably a data length for each status information to be returned.

The apparatus of the invention features a disk storage controller having a memory for receiving and storing information from the disk storage devices, a network connecting the interrogating host computer to the disk storage controller and operating in accordance with a known protocol, an array of disk storage devices connected to the disk storage controller, a communications network for enabling each disk storage device to deliver information regarding the disk storage device to the disk storage controller for storage in the memory, and wherein the interrogating host computer has a network interface for requesting the information from the disk storage controller and the disk storage controller responds to the network request for transmitting the information to the interrogating host computer.

The apparatus further features the network connecting the host computer to the disk storage controller being a SCSI bus interconnecting network wherein the network requests from the interrogating host computer to the disk storage controller uses a SCSI Inquiry command. The disk storage controller features a controller interface which can respond to the SCSI command with the requested information. As noted above, the requested information in the Inquiry command defines a list or group of disk storage devices about which the information is requested and further specifies the particular types or classes of information which the host computer requires. In response to the request, the disk storage controller provides, in addition to the requested data, needed identification information including the data length parameters for the requested information.

The invention further relates to an interconnected network of disk storage devices and their controller, each device having at least one disk drive and the devices being connected to the controller for communicating group information about selected groups of the devices to a connected requesting host computer. The disk storage controller features at least one host interface port operating in accordance with a known protocol, at least one network interface for communicating with the disk storage devices, and memory for storing status information about the disk storage devices. The disk storage controller further features said memory storing the status information received from each of the disk storage devices of the group or groups which can be specified in an interrogating command received from the host computer.

The method of the invention can further relate to operating a disk drive storage system having a plurality of disk storage devices, each of the devices being able to communicate with at least one disk drive controller and each disk storage device being connected to at least one disk drive. The method, in accordance with this aspect of the invention, features the steps of requesting, from the disk storage devices, information about the devices, storing the requested information at the disk storage controller, and responding, at the disk storage controller, to a request from a connected host for at least a portion of the stored requested information, by delivering the requested information to the bus to which the requesting host is connected.

In this manner, in accordance with the invention, an interrogating host computer can obtain required information, for example status information, from a connected disk drive controller regarding all of the disk drives, or specified groups of the disk drives, connected to the controller, even though the host computer does not have access to or operational functionality with one or more of the disk storage devices for which information is requested. As a result, the host graphics user interface enables a user to control, and receive information about, in an up to date manner, all of the disk drive elements in the group or groups with which the user is concerned.

BRIEF DESCRIPTION OF THE DRAWING

Other objects, features, and advantages of the invention will appear from the following description taken together with the drawings in which:

FIG. 3 is a table illustrating the format of an EVPD command;

FIG. 4 is a table illustrating the format of the returned data for an EVPD Inquiry command;

FIG. 5 is the format of the specific header for a page in the response to an EPVD Inquiry command;

FIG. 6 is a table illustrating examples of information requested and returned by different classes of commands, as indicated by page code.

DESCRIPTION OF A PREFERRED EMBODIMENT

Figure 1:
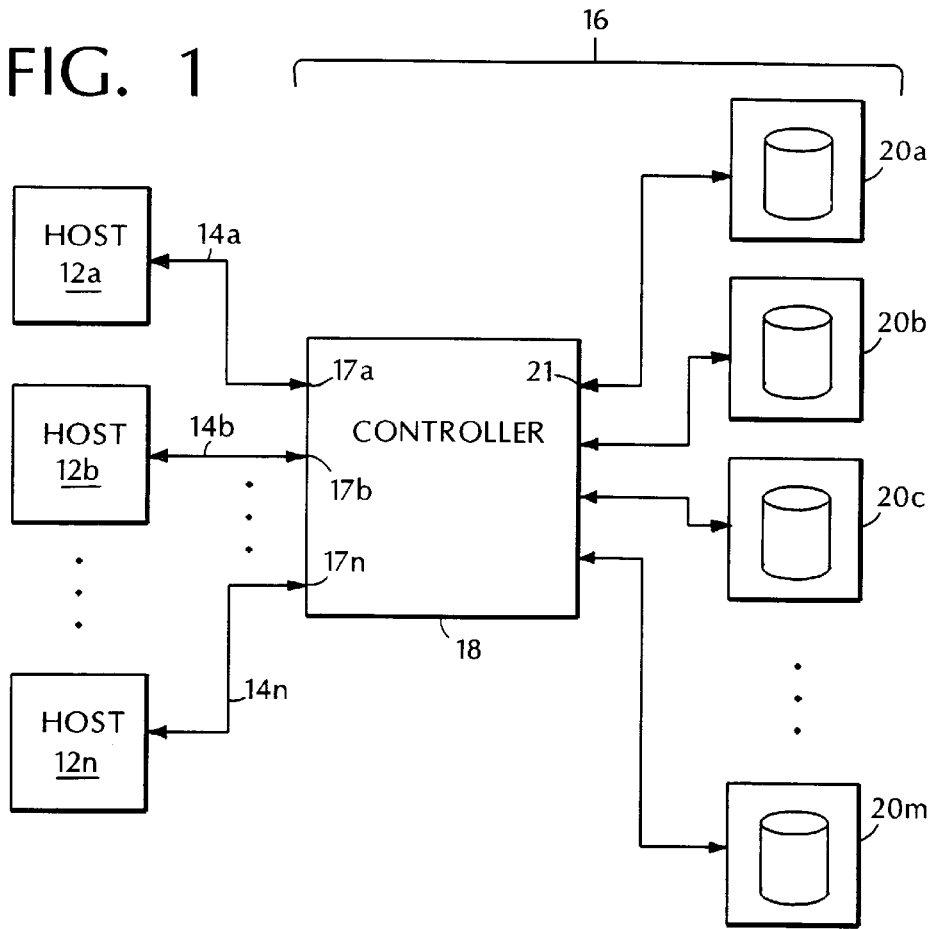
FIG. 1 is a block diagram illustrating the disk drive/host computer system with which the invention is particularly useful.

Referring to FIG. 1, a plurality of host computers 12a, 12b, . . . , 12n connect to a disk drive system 16 at ports 17a, 17b, . . . , 17n, over buses 14a, 14b, . . . 14n. Buses 14, in accordance with a preferred embodiment of the invention, operate using a SCSI protocol. The disk drive storage system 16 has a disk drive controller 18, such as a Symmetrix® controller system manufactured by EMC Corporation and a plurality of disk drive elements 20a, 20b, 20c, . . . , 20m, which connect to ports 21 of controller 18. The disk drive elements 20a, 20b, . . . , 20m can also connect, in other particular embodiments, to the disk drive controller 18 over a network such as a SCSI bus network. The disk drive elements 20 typically are disk storage devices having at least one disk drive.

Figure 2:
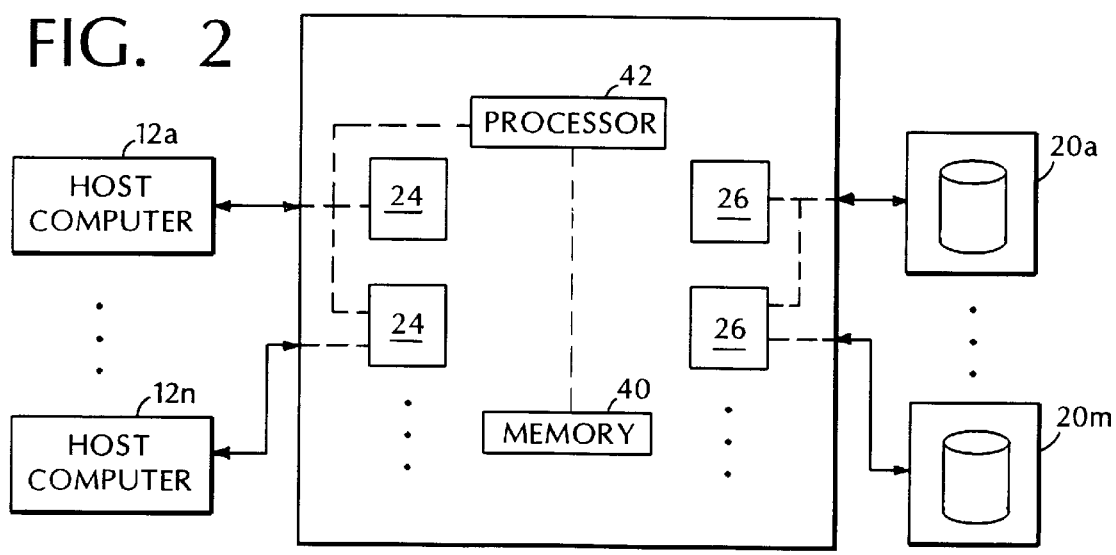
FIG. 2 is a more detailed block diagram illustrating the operation of the disk drive controller and its connected disk drive elements.

In this particular embodiment of the invention, referring to FIG. 2, the controller 18 has a plurality of channel directors 24, having the ports 17, and disk directors 26, having the ports 21a, . . . , 21k. Communications between the host computers 12 and the disk drive controller 18 preferably takes place according to a SCSI protocol as is well defined by the SCSI standard. In normal operation, absent any other controlling mechanism, more than one host computer 12 can access and/or attempt to control, through different ports, the controller 18 to read/write data, reallocate devices, etc. Typically, however, different applications, running on different host computers, access different disk drive elements.

In one particular application, according to the invention, one of the host computers, for example host computer 12a, provides a graphical user interface (GUI) which enables a user at that computer to completely control and display up-to-date information describing various aspects of the disk storage system 16 and controller 18. However, if host computer 12a only has access to controller 18 over a SCSI bus, and through that bus further only has access to a select subset of the disk drive elements 20, the availability to host computer 12a of information relating to the entire disk storage system can be severely limited. Further, the SCSI protocol does not have available to it, in its normal command set, a command which can retrieve the necessary status information to enable host computer 12a to obtain information for a selected group of disk drive elements where one of the disk drive elements is not accessible to the host computer 12a.

Accordingly, therefore, a modification of the standard SCSI inquiry command is used as follows. The SCSI inquiry command has two operating modes. In a first mode, the "standard" mode, the Inquiry command returns general information about a device, for example drive elements 20a, 20b, . . . . In its second mode, the Inquiry command returns a Vital Product Data (VPD) page. These are special inquiry pages that the device can use to return special information or to perform special operations. VPD pages are distinguished from standard SCSI pages by the setting of the "EVPD (enable VPD)" bit in the Inquiry command plus a specification in the command of a specific VPD page number. Referring to FIG. 3, the format of an Inquiry command is illustrated, and in FIGS. 4–5, a VPD page format, useful in particular with the present invention, is illustrated.

Thus, referring now to FIG. 3, when the host computer 12a is ready to retrieve information regarding a group of disk drive elements, it sends to the controller 18 an Inquiry command requesting the return of a VPD page. That Inquiry command, includes, in addition to the command operations code 60, the EVPD bit 62, and the page code 64, a range information data 66 identifying the range, or group, of devices about which information is requested, and length information 68 identifying the number of bytes for each device. The command also includes a control byte 70. The page code defines the type of information returned about the devices within the range. In the illustrated embodiment, a range value of "O" (an otherwise invalid value) returns information regarding the format of the requested pages.

The controller 18, in response to this "special" Inquiry command, returns the data which has been requested. The return information, referring to FIG. 4, has a standard vender header 80, a specific header 82 for the requested page, and the device information or "records" 84.

Referring to FIG. 5, the specific header 82 associated with each page includes, in this illustrated embodiment of the invention, both the number of devices 86 which are returned per page, and the length 87 of the record per device, as well as the specific information 88 being requested.

Referring to FIG. 6, the specific examples of information which can be requested include the nature of device protection (Page Code 01), device status (Page Code 02), the device write/format count (Page Code 03), and the device invalid tracks (Page Code 04). The record length (shown in FIG. 6 for these sample codes) will typically be different, for different requested data commands and this information is reflected in the specific page header. Also, the number of devices returned per page will vary accordingly.

Specifically, referring now to FIGS. 2 and 6, the disk storage controller 18 has a memory 40 into which a disk controller processor 12 places the information regarding the disk drive elements connected to it. That information is stored together in memory 40 and is formatted either in memory 40 or on-the-fly by processor 42 to the required special VPD page format in accordance with the requested group of information. The processor 42 thus collects the information from memory 40 and once formatted provides it in response to the extended VPD Inquiry command from the host computer 12a.

In another embodiment of the invention, the processor 42 can periodically poll the disk drive elements 20, in the event the disk drive elements 20 are "smart" disk drive elements, to obtain the necessary information from them. It is this information which can be later provided to the host computer 12a as requested. Such periodic polling insures that the memory 40 will, in a substantially real-time basis, have current information regarding the disk storage devices 20, which can be collected, for a group of those devices, or a group of all of the devices, and made available to the host computer which requires it, for example, for updating the GUI display.

Figure 7:
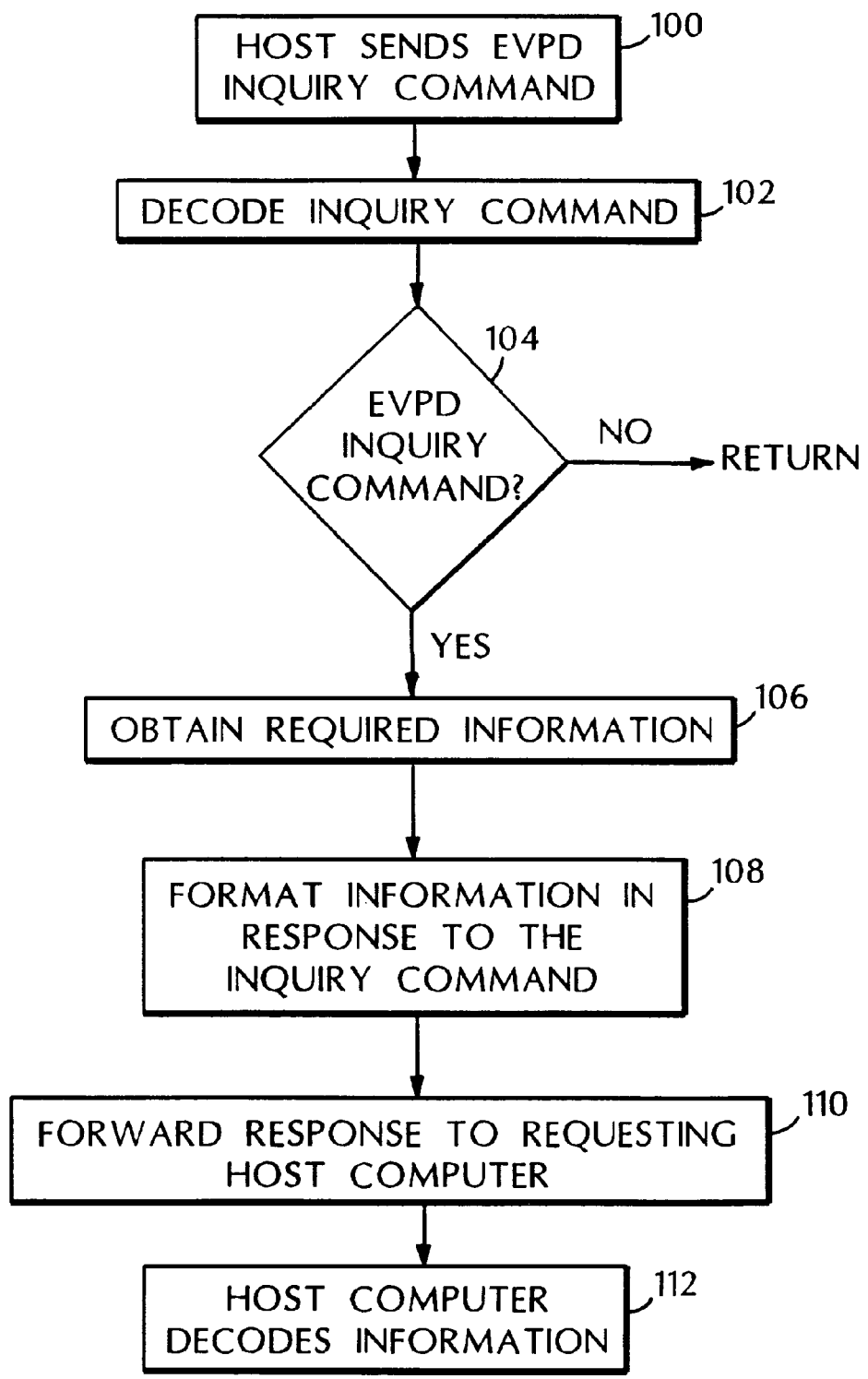
FIG. 7 is a flow chart illustrating a typical operation in accordance with the invention.

In operation, then, referring to FIG. 7, the host computer 12a (for example) sends the VPD page version of the Inquiry command to the disk controller 18 (Step 100) providing the controller with the identification of a group of devices for which it needs information. It also provides the other information (FIG. 3) which the controller needs as part of the command structure as noted above. In response, at the disk drive system, when the Inquiry command is received, it is decoded by processor 42 (step 102). The controller first compares the identification provided by the host issuing the command to determine the nature of the command (Step 104). Once the system identifies it as a VPD Inquiry command, the processor 42 collects the required information from memory 40 (Step 106), formats it in accordance with the command response structure (Step 108), and makes it available to the host computer 12a (Step 110). The host computer 12a, thereafter receives the command, decodes the information available in the VPD pages (Step 112), and uses that information, for example, for updating the GUI display as described and referred to in co-pending U.S. application Ser. No. 08/657,337, filed Jun. 3, 1996, entitled, "USER CONTROLLED STORAGE CONFIGURATION USING GRAPHICAL USER INTERFACE, the contents of which are incorporated herein by reference.

Additions, subtractions, and other modifications of the preferred and illustrated embodiment of the invention will be apparent to those practiced in this field and are within the following claims.

What is claimed is:

1. A method for determining information about a plurality of disk storage devices connected to an interrogating host computer through a disk storage controller, said host being one of a plurality of host computers connected to said disk storage controller, said interrogating host being connected to said storage controller over a network bus interface, said interrogating computer having access to less than all of said plurality of disk storage devices, said method comprising the steps of sending a group status inquiry command from said interrogating host computer to said disk storage controller, and returning from said disk storage controller, requested group status information, said group status information including status information regarding disk storage devices not accessible to said interrogating host computer.

2. The method of claim 1 further comprising the step of storing information regarding a group of said disk storage devices at said disk storage controller.

3. The method of claim 1 further wherein said network bus interface is a SCSI bus, said group status inquiry command is a SCSI EVPD Inquiry command, and the returned requested group status information is contained in returned VPD pages.

4. The method of claim 3 further comprising the steps of specifying, in said SCSI Inquiry command, a list of devices for which status information is requested, an identification of what types of information are to be returned, and a data Length for each status information to be returned.

5. The method of claim 4 further comprising the step of specifying in said response to the EVPD Inquiry command, the length of each record per device, and the number of devices per page.

6. The method of claim 4 wherein said types of information include at least one of device status, device protection, device write/format count, and device invalid tracks.

7. Apparatus for determining information about a plurality of disk storage devices connected to a plurality of host computers through a disk storage controller, different ones of said host computers having access to different ones of said plurality of disk storage devices, a selected one of said host computers being designated an interrogating host computer for receiving said information, said apparatus comprising said disk storage controller having a memory for receiving and storing said information, a network connecting said interrogating host computer to said disk storage controller and operating according to a known protocol, an array of said disk storage devices connected to said disk storage controller, a communications network for enabling each said disk storage device to deliver information regarding said disk storage device to said disk storage controller for storage in said memory, said interrogating host computer having a network interface for requesting said information from said disk storage controller, regarding a group of said disk storage devices, at least one of which is not accessible to said interrogating host computer, and said disk storage controller responding to said network request for transmitting said information to said interrogating host computer.

8. The apparatus of claim 7 further wherein said network connecting the interrogating host computer to the disk storage controller comprises a SCSI bus interconnecting network and said network request from said interrogating host to said disk storage controller uses a SCSI Inquiry command, and said disk storage controller has a controller interface for responding to said SCSI Inquiry command.

9. The apparatus of claim 8 further wherein said Inquiry command defines a group of disk storage devices about which said information is requested and specifies classes of information being requested.

10. The apparatus of claim 8 further wherein said disk storage controller identifies, in the response to said Inquiry command, data length parameters for said requested information.

11. The apparatus of claim 10 further wherein said response to the EVPD Inquiry command includes the length of each record per device, and the number of devices per page.

12. The apparatus of claim 10 wherein said types of information include at least one of device status, device protection, device write/format count, and device invalid tracks.

13. An interconnected network of disk storage devices, each device having at least one disk drive, said devices being connected to a disk storage controller for communicating group information about selected groups of said devices to a connected requesting host computer, said disk storage controller having
at least one disk interface port operating in according with a known protocol,
at least one network interface for communicating with the disk storage devices, and
a memory for storing status information, and said disk storage controller memory storing status information received from each of said disk storage devices of a group returning to an interrogating host computer status information regarding disk storage devices not accessible to said interrogating host computer.

14. The device network of claim 13 further comprising a SCSI network for connecting said disk storage controller to the requesting host, the request to the controller over the SCSI network being made using an Inquiry command, and at least one disk storage device of the group being inaccessible to the requesting host.

15. The device network of claim 14 further wherein the memory of the disk storage controller comprises a plurality of VPD pages.

16. The device network of claim 14 wherein said disk storage controller further comprises a processing circuit for determining from said Inquiry command about which of said devices information is requested, and which information is requested, and for responding over the SCSI network with the requested information, including data length information.

17. The apparatus of claim 16 further wherein said response to the EVPD Inquiry command includes the length of each record per device, and the number of devices per page.

18. The apparatus of claim 16 wherein said types of information include at least one of device status, device protection, device write/format count, and device invalid tracks.

19. A method for operating a disk drive storage system having a plurality of disk storage devices, each of said devices being able to communicate with a disk drive controller, and each disk storage device including at least one disk drive, said method comprising the steps of requesting, from said disk storage devices, information about said devices, storing said requested information at said disk storage controller, and responding, at said selected disk storage controller, to a request from a connected host, for at least a portion of said stored requested information, by delivering said requested information to the requesting host, at least one of said devices for which information is requested being inaccessible to said requesting host.

20. The method of claim 19 wherein said disk storage controller connects to said host over a SCSI bus, and said selected disk storage controller responds to a SCSI EVPD Inquiry command using VPD pages.

21. The method of claim 20 wherein said responding step further comprising the steps of determining from the Inquiry command a range of devices for which information is requested, determining from the Inquiry command the classes of information which are requested, and providing a data length to the requesting host detailing data lengths for the requested data.

22. The method of claim 21 further comprising the step of specifying in said response to the EVPD Inquiry command, the length of each record per device, and the number of devices per page.

23. The method of claim 21 wherein said types of information include at least one of device status, device protection, device write/format count, and device invalid tracks.

* * * * *